United States Patent [19]
Keith et al.

[11] Patent Number: 5,799,902
[45] Date of Patent: Sep. 1, 1998

[54] ECONOMICAL LAUNCH VEHICLE

[75] Inventors: Edward L. Keith, La Verne; Thomas P. Bauer, Redondo Beach, both of Calif.

[73] Assignee: Microcosm, Inc., Torrance, Calif.

[21] Appl. No.: 900,923

[22] Filed: Jul. 28, 1997

Related U.S. Application Data

[63] Continuation of Ser. No. 529,808, Sep. 18, 1995, abandoned.

[51] Int. Cl.$^6$ .............................. B64C 15/02; B64F 1/10; B64G 1/40; B64G 1/42
[52] U.S. Cl. .................... 244/55; 244/2; 244/74; 244/63; 244/76 J; 244/54; 244/172
[58] Field of Search ..................... 244/3.1, 3.21, 244/3.22, 172, 52, 54, 55, 58, 60, 63, 67, 73 B, 74, 76 J, 190, 2; 89/1.8, 1.814

[56] References Cited

U.S. PATENT DOCUMENTS

| | | | |
|---|---|---|---|
| 2,960,033 | 11/1960 | Jackson | 89/1.8 |
| 3,049,876 | 8/1962 | Connors | 244/74 |
| 4,779,821 | 10/1988 | Sutton | 244/3.22 |
| 4,796,839 | 1/1989 | Davis | 244/172 |
| 4,884,770 | 12/1989 | Martin | 244/172 |
| 4,964,340 | 10/1990 | Daniels et al. | 244/172 |
| 4,991,393 | 2/1991 | Otten et al. | 60/204 |
| 5,129,602 | 7/1992 | Leonard | 244/172 |
| 5,141,181 | 8/1992 | Leonard | 244/172 |
| 5,143,328 | 9/1992 | Leonard | 244/172 |
| 5,217,187 | 6/1993 | Criswell | 244/172 |
| 5,217,188 | 6/1993 | Thole et al. | 244/63 |
| 5,242,135 | 9/1993 | Scott | 244/172 |

OTHER PUBLICATIONS

JBIS Journal of the British Interplanetary Society, vol. 47, No. 9, Sep. 1994, London, GB pp. 357–362 "The Mishin Mission Dec. 1962—Dec. 1993," Charles P. Vick.

*Primary Examiner*—Virna Lissi Mojica
*Attorney, Agent, or Firm*—Noel F. Heal

[57] ABSTRACT

A low-cost, liquid-propellant rocket launch vehicle having a central pod that carries an optional final-stage rocket engine cluster, and having additional engine clusters arranged in diametrically opposed pairs of clusters. The pairs of clusters are burned and separated in a staging sequence until the final stage is reached. In the presently preferred embodiment, there are three pairs of engine clusters arranged in a hexagonal configuration about the central pod and each engine cluster contains seven identical engines. The engines are made from light-weight, low-cost materials, without gimbals or other moving parts. Steering of the vehicle is effected by differential control of the engine thrusts of selected engines, using duty-cycle modulation of a plurality of on/off propellant supply valves and, additionally, control of other on/off valves controlling the supply of an inert cryogenic fluid to secondary injection ports on the engine. An onboard gas generator provides inert gas for fluid pressurization and preferably uses as its principal reactant the same material used as the cryogenic fluid. Navigation is effected with inexpensive onboard systems and the entire vehicle provides a dramatic reduction in cost in comparison with conventional launch vehicles.

22 Claims, 9 Drawing Sheets

ECONOMICAL LAUNCH VEHICLE

This application is a continuation, of application No. 08/529,808, filed Sep. 18, 1995, now abandoned.

BACKGROUND OF THE INVENTION

This invention relates generally to rocket propelled vehicles for launching unmanned spacecraft of various sizes, such as earth-orbiting satellites used for communication systems or for terrestrial or astronomical observation. Traditionally, launch vehicles are large, multi-stage rockets, often designed for other purposes and adapted for launching satellites and similar spacecraft. Launching a satellite into orbit is presently a very expensive operation in practically all respects, including non-recurring development cost and recurring hardware and launch operation costs. Each launch vehicle is not "manufactured," in the common meaning of that term, but is built and assembled each time by engineers and technicians whose time is valuable.

To obtain the requisite orbital velocity, launch vehicles are typically designed to have multiple stages, which are basically separate rocket engines and propellant tank sets built one on top of the other. When propellant for the first stage is used up, the first-stage engine and tank set are discarded in flight, and a second-stage engine or set of engines are ignited to further accelerate the "payload" of the launch vehicle. Multi-stage launch vehicles, whether they use vertically stacked stages or "strapped on" stages as in the manned space shuttle vehicle, require a costly gantry assembly at the launch site, to service the vehicle's many systems located at various heights above the ground. Although parts of the gantry assembly may be reused, its presence represents a significant element in the overall launch cost. A related drawback in the launching of tall, multi-stage vehicles is that inclement weather conditions at the launch site, either on the ground or at high altitude, frequently result in delayed or canceled missions. A launch vehicle that requires a gantry also poses difficulties of final assembly and transportation to the launch site.

Another aspect of the high cost of traditional launch vehicles is the high cost and complexity of the individual rocket engines. These usually have large numbers of interdependent components, estimated to be as many as 15,000 for a typical liquid propellant engine. An entire launch vehicle may have as many as 100,000 parts or more. Obviously, systems of this degree of complexity are costly both to build and to maintain for reuse. Reliability is also a significant factor, especially as the engines become older.

Another aspect that contributes to the high cost of launch vehicles is their guidance, navigation and control systems. Originally, launch vehicles were guided and controlled from the ground, using onboard telemetry systems to report vehicle position, attitude and other data to ground-based controllers, which then issue commands to the vehicle to effect the desired controlled maneuvers of the vehicle. Currently, most vehicles use expensive inertial systems for navigation, and many vehicles use outdated analog systems.

Yet another drawback of conventional launch vehicle designs is that they are not easily adaptable to carry payloads of various sizes. Launch missions may involve payloads anywhere from a few hundred kilograms (kg) (under 1,000 lb) up to 50,000 lb (approximately 22,700 kg) lifted into low earth orbit (LEO), or beyond. Adaptability, or scalability, to carry such a wide variety of payloads has further added to the expense of conventional launch vehicles, which are typically custom designed for each launch mission.

It will be appreciated from the foregoing that there is a need for improvement in the design of launch vehicles and related equipment. The present invention provides a solution to most of the drawbacks of the prior art, as will be further explained in the following summary.

SUMMARY OF THE INVENTION

The present invention resides in an economical launch vehicle that uses a combination of features to achieve a dramatically reduced cost for launching spacecraft such as earth-orbiting satellites and the like.

Briefly, and in general terms, the vehicle of the invention comprises a central structure containing the payload; and a plurality of clusters of rocket engines, the clusters being configured at launch in symmetric groups of clusters, such as pairs or triplets, with each group being disposed symmetrically about the central structure. Each group of engine clusters is burned and separated from the vehicle in a staging sequence, and each cluster consists of a plurality of practically identical engines without gimbals. The vehicle further includes at least two propellant tanks for supplying liquid fuel to each engine cluster, valve control means for regulating the supply of propellant to the engines, and a steering control system, for modulating the supply of propellant to selected engines, to provide differential thrust control to effect steering of the vehicle.

Optionally, the central structure may include an additional engine cluster to provide a final rocket stage. In the presently preferred embodiment, there are three pairs of engine clusters arrayed about the central structure in a hexagonal configuration, providing three rocket stages before the optional final stage. Also in the preferred embodiment, each engine cluster includes seven individually controlled engines arranged with six of the engines forming a hexagonal configuration about a seventh engine. Ideally, the ratio of the height of the vehicle to the base width of the vehicle at launch is less than 3:1.

Preferably, the launch vehicle of the invention also includes an onboard gas generator for generating an inert gas for propellant tank pressurization. For further economy, the onboard gas generator generates the inert gas from a reactant fluid that is also used as a secondary injection fluid and for ignition of the engines. More specifically, the onboard gas generator includes a supply of reactant fluid, a supply of cryogenic fluid, a reaction chamber in which the reactant fluid reacts to produce an inert gas and heat, a mixing chamber to mix cryogenic fluid and hot inert gas, and a filter for removing the unwanted products of the reaction, leaving the inert gas for use as a pressurizing gas in liquid propellant supply tanks on the vehicle.

The invention may also be defined in terms of a method for launching a payload along a desired trajectory, using a horizontally staged launch vehicle. Briefly, the method comprises the steps of placing a payload in a central rocket pod of a launch vehicle; assembling the launch vehicle in a broad-based configuration having groups of engine clusters surrounding the central pod in a symmetrical arrangement; burning and then separating a first group of the engine clusters; burning and then separating additional groups of engine clusters in a staged burn sequence; and steering the vehicle by modulating the thrust of selected engines, to tilt the vehicle about a selected axis.

In the presently preferred embodiment of the method, modulating the thrust of selected engines is effected by opening or closing throttle valves through which propellant is supplied to the selected engines. The method may also include generating a supply of inert gas on the launch vehicle, and applying the inert gas to pressurize propellant supplies for the vehicle.

It will be appreciated from this summary that the present invention provides a significant improvement in launch vehicles and methods for their operation. In particular, the combination of the present invention results in huge cost reductions, both for vehicle developmental costs and for recurring launch costs. Other aspects and advantages of the invention will become apparent from the following more detailed description, taken in conjunction with the accompanying drawings, which are briefly described below.

DESCRIPTION OF THE PREFERRED EMBODIMENTS

As shown in the drawings for purposes of illustration, the present invention pertains to spacecraft launch vehicles and to various configurations of launch vehicle hardware for launching a variety of payloads from the ground to a desired orbit or trajectory. Conventional launch vehicles are relatively expensive because they use complex engine hardware and ground-based equipment, and because they are built and assembled on a custom-design basis rather than routinely manufactured. In a conventional launch vehicle, the cost launching small payloads (up to 1,400 kg) is approximately $15–20 million per launch, and as high as approximately $46,200 per kg of payload. For medium payloads (up to 10,000 kg) the cost per launch is in the range of approximately $45–120 million, and as high as approximately $12,500 per kg of payload. The launch vehicle of the present invention provides a cost reduction by a factor of ten or more. For a small payload of 1,000 kg, the launch cost is estimated at $1.7 million, or $1,700 per kg, and for a medium payload of 6,800 kg the launch cost is estimated at $7.9 million, or $1,170 per kg. As further explained below, these dramatic reductions in cost are achieved without sacrifice in efficiency or reliability. In fact, the launch vehicle of the invention provides reliable launching either on-schedule or on-demand at short notice, and is affected by weather only to approximately the same extent as commercial aircraft.

Figure 1:
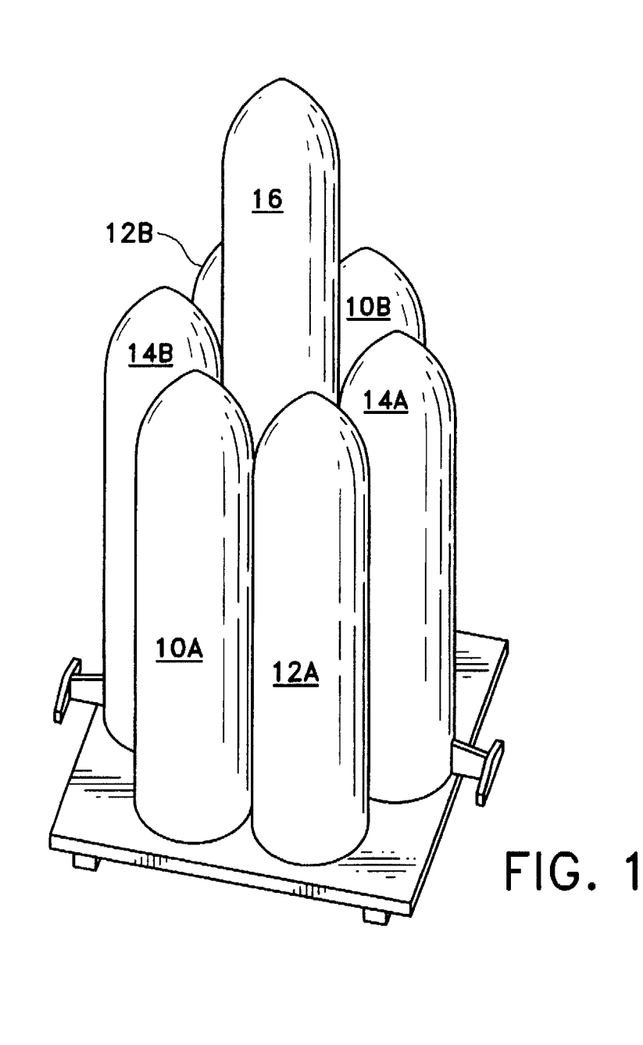
FIG. 1 is simplified perspective view of the launch vehicle of the present invention at lift-off.
Figure 2:
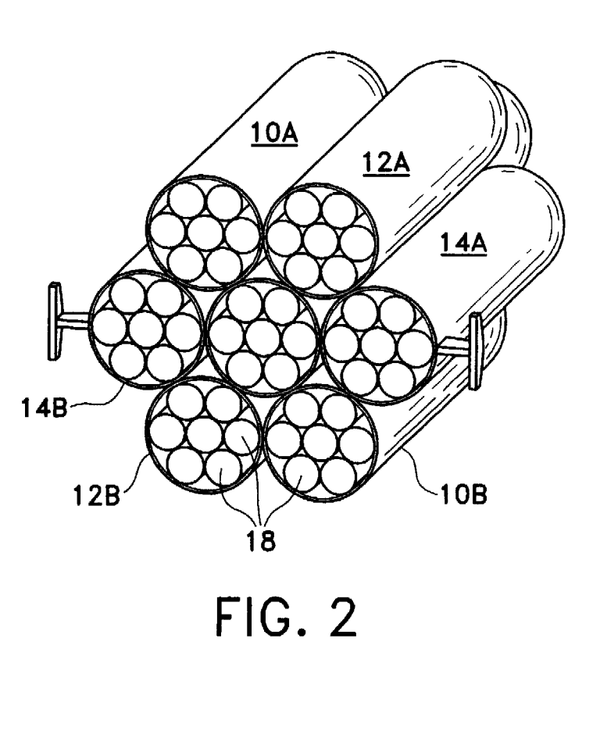
FIG. 2 is another perspective view of the launch vehicle, as seen from below, and showing the configuration of engines and engine clusters in the presently preferred embodiment.

Staging Configurations:

The basic configuration of the launch vehicle of the present invention uses horizontal staging. That is to say, the rocket stages are arrayed at the same horizontal level at the launch position. In the presently preferred embodiment, each stage consists of a pair of rocket engine clusters that are diametrically opposite each other in the launching configuration. It will be understood that other symmetrical groups of engine clusters may be employed, such as triplets of engine clusters. In the depicted preferred embodiment, best shown in FIGS. 1 and 2, there are three pairs of engine clusters, indicated by 10A and 10B, 12A and 12B, and 14A and 14B, respectively. The six engine clusters are arrayed in a hexagonal configuration around a central fourth-stage engine cluster 16, which is longer than the other clusters. As best shown in FIG. 2, each of the seven engine clusters consists of seven individual engines, indicated generally at 18 and not individually identified. The seven engines 18 in each cluster are preferably arranged in a hexagonal pattern similar to the way the clusters are arranged, with six engines surrounding a centrally positioned engine.

Each engine cluster (10A, 10B, 12A, 12B, 14A, 14B and 16) is housed in a cylindrical pod with a rounded, nearly conical nose fairing. The overall configuration has an unusually small height-to-base ratio for a launch rocket. The ratio at launch is less than 3:1 measured in all horizontal axes. This short, wide configuration presents a larger drag profile than conventional multi-stage rockets and, therefore, is less efficient at lower altitudes. However, the wide shape of the launch vehicle is mechanically very stable at launch. Launching gantries and related equipment are unnecessary, and the vehicle is less prone to wind and weather conditions during launch.

Figure 3A:
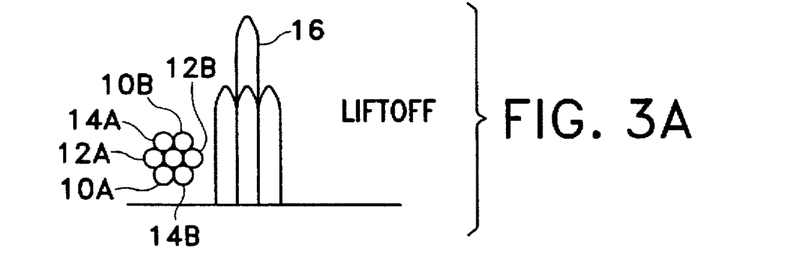
FIGS. 3A–3E are together a sequence of diagrams depicting staging of the launch vehicle as successive pairs of engine clusters are burned and separated from the vehicle.
Figure 3B:
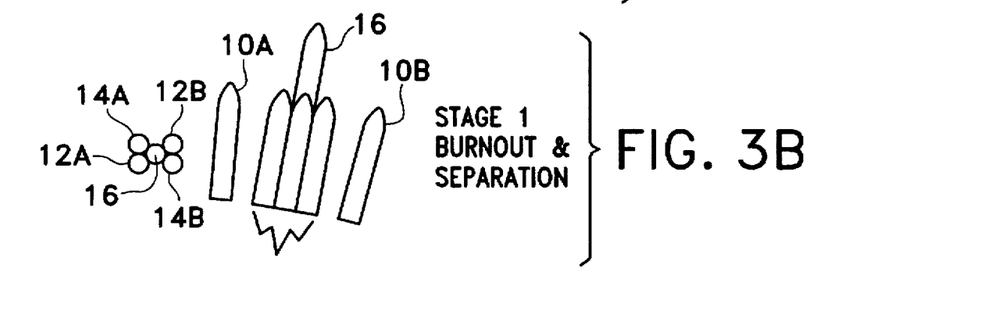
Figure 3C:
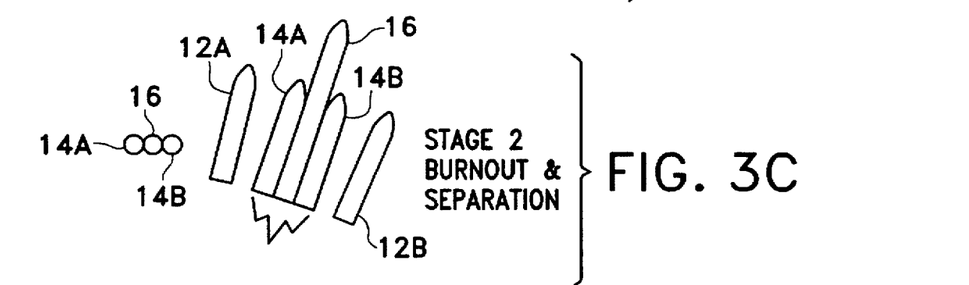
Figures 3D, 3E:
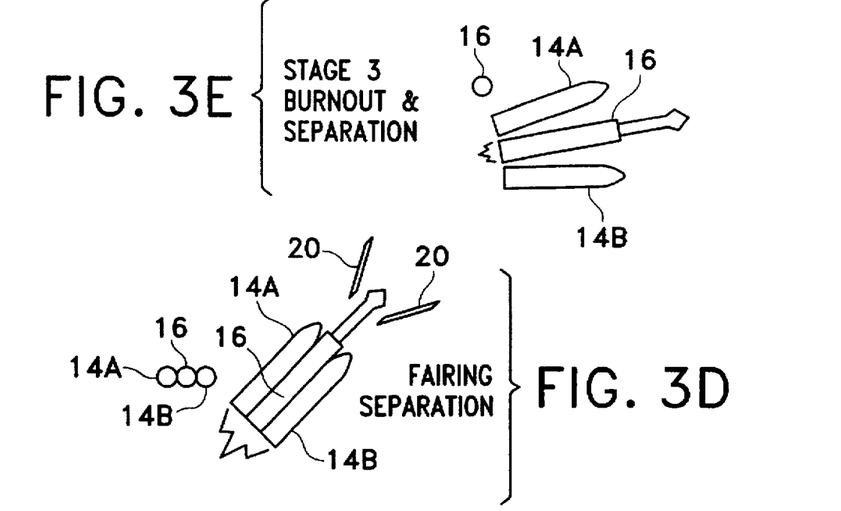

FIGS. 3A–3E depict in diagrammatic form how the first three stages of the launch vehicle are separated. FIG. 3A shows the complete configuration at lift-off, in elevation and end view. After stage-one burn-out and separation, as indicated in FIG. 3B, the first-stage engine clusters 10A and 10B are separated from the vehicle, leaving a still symmetrical configuration of the central cluster 16 and second- and third-stage clusters 12A, 12B and 14A, 14B. After second-stage burn-out and separation, as indicated in FIG. 3C, the second-stage clusters 12A and 12B are separated from the vehicle, leaving a configuration of three engine clusters 14A, 14B and 16 arranged in a common plane. At third-stage burnout, the fairing 20 of the fourth-stage cluster 16 may be separated from the vehicle, as indicated in FIG. 3D. Then the third-stage engine clusters 14A and 14B are separated, as shown in FIG. 3E, leaving only the fourth-stage cluster 16 to complete the mission.

Figure 4A:
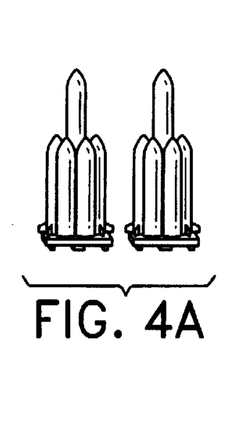
FIGS. 4A–4D are simplified perspective views similar to FIG. 1, showing four different size configurations of the vehicle of the invention.
Figure 4B:
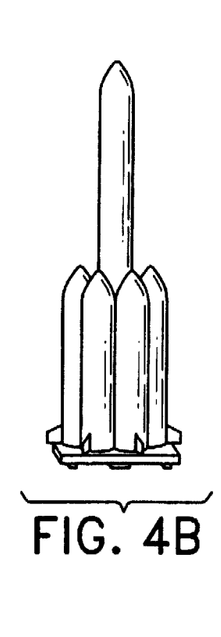
Figure 4C:
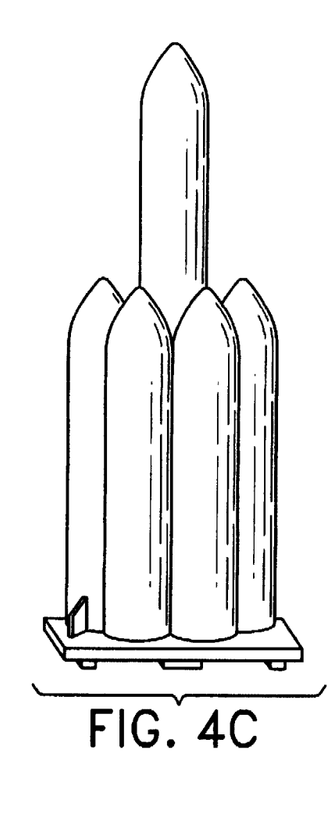
Figure 4D:
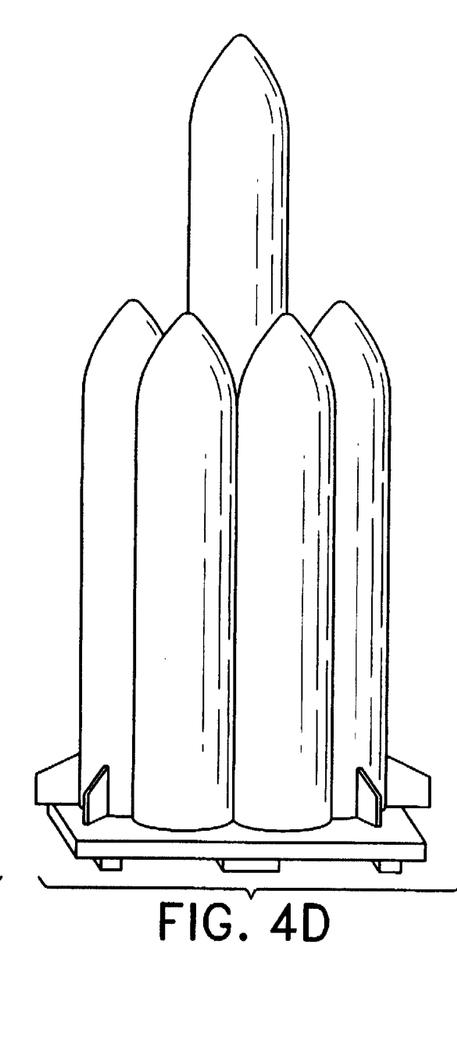

The basic launching configuration described above is easily scaled and adapted for various missions and payloads. FIGS. 4A–4D show four possible configurations. FIGS. 4B, 4C and 4D are conceptually identical configurations, each with seven engine clusters as described above, but appropriately scaled to handle light lift, medium lift and heavy lift payloads. The light lift configuration of FIG. 4B is designed to lift a payload of up to 2,500 lb (approximately 1,135 kg) to low-earth orbit (LEO). The medium lift configuration of FIG. 4C is designed to lift a payload of 15,000 lb (approximately 6,820 kg) to LEO, and the heavy lift configuration of FIG. 4D is designed to lift a payload of approximately 50,000 lb (22,730 kg) to LEO. FIG. 4A depicts an even smaller configuration than that of FIG. 4B, for use as a sub-orbital sounding rocket.

Figure 5:
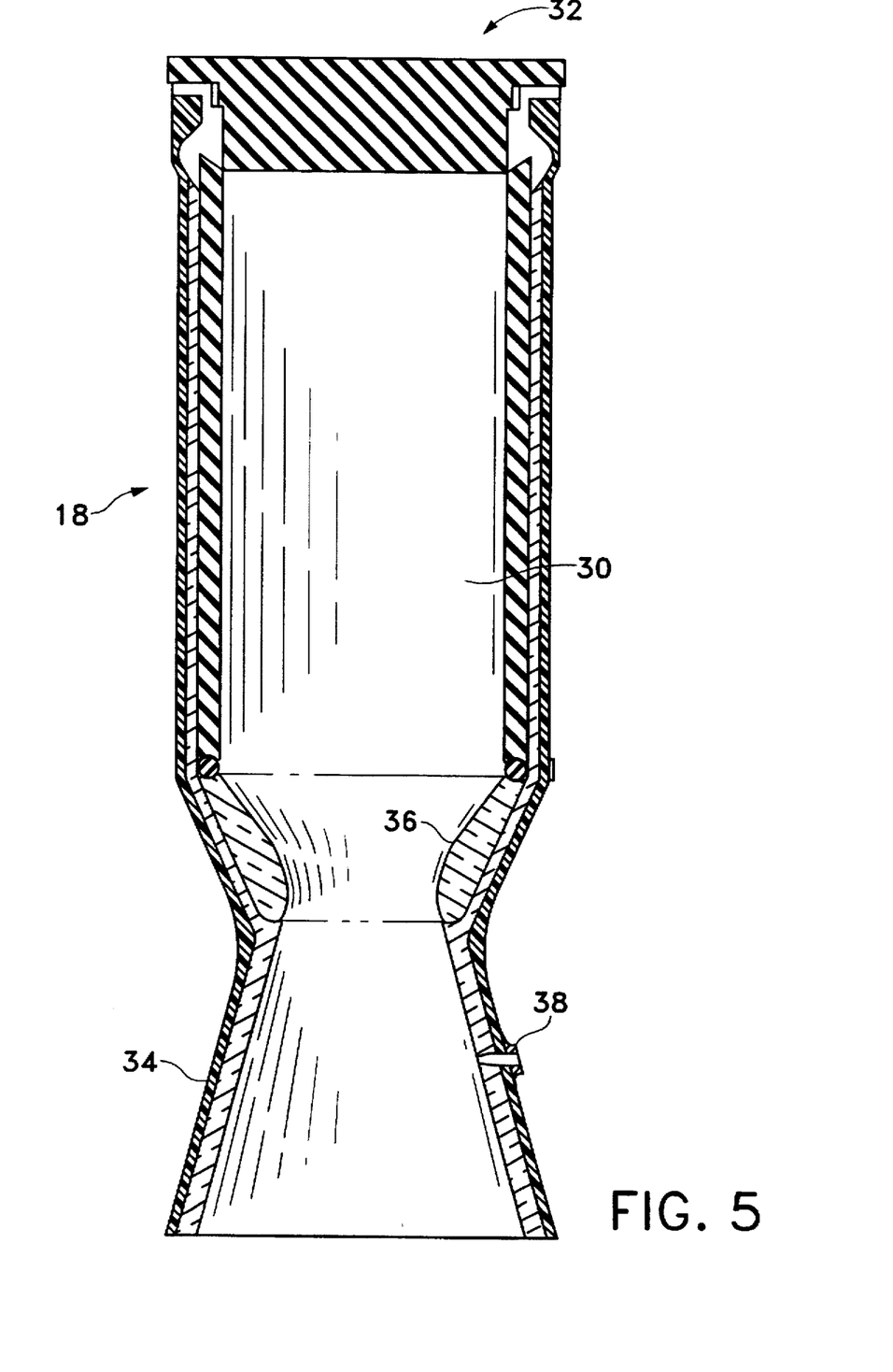
FIG. 5 is a cross-sectional view of one of the rocket engines used in the vehicle of the invention.

Engine Configuration and Steering:

Conventional launch vehicles use gimballed engines to effect steering and control the vehicle during launch. An engine designed to be pivoted on gimbals is a much more complex piece of machinery than one that is not. The rocket engine used in the launch vehicle of the present invention is a relatively simple liquid-fueled device with virtually no moving parts except valves, as indicated in FIG. 5. It consists of a generally cylindrical combustion chamber 30, an injector assembly 32 through which propellant materials are injected into the chamber, and a flared exhaust nozzle 34 through which products of combustion are accelerated. Gases and products of combustion pass through a tapered venturi or throat section 36 to reach the exhaust nozzle 34. The engine also includes three fluid injection ports, one of which is shown at 38 in the exhaust nozzle 34. Injection of a secondary fluid into the exhaust stream imparts a transverse velocity component to the exhaust and thereby deflects the engine thrust vector. In the presently preferred embodiment of the invention, the secondary injection fluid is HAN/TEAN, which is more specifically defined below. The three injection ports are angularly spaced about the longitudinal axis of the engine, at 120° intervals, to provide for deflection of the thrust vector in any of six possible directions when one or two ports are activated.

The engines are designed to operate on any grade of kerosene as fuel, but the fuel is preferably a grade referred to as RP-1. Jet fuel designated Jet-A may also be used. The oxidant is liquid oxygen (LOX).

Each engine 18 is of identical design and is fixed in its mounting in an engine cluster. The principal moving parts associated with the engines 18 are propellant valves, which are used to control engine thrust and to turn individual engines on and off. Steering in the vehicle is effected by differential thrust control of individual engines and engine clusters. Differential thrust control of the engines is an effective steering technique that avoids the need for gimballed engines and thereby drastically reduces the number of moving parts associated with each engine. The technique is especially effective in this vehicle because of its relatively low height-to-base ratio, which results in a relatively large steering torque. The principal technique of differential thrust vector control used in the invention is throttling each engine using on/off valves, as further explained below. Additional steering capability is provided by selectively supplying a secondary injection fluid through the ports 38 in the exhaust nozzle 34.

Figure 6:
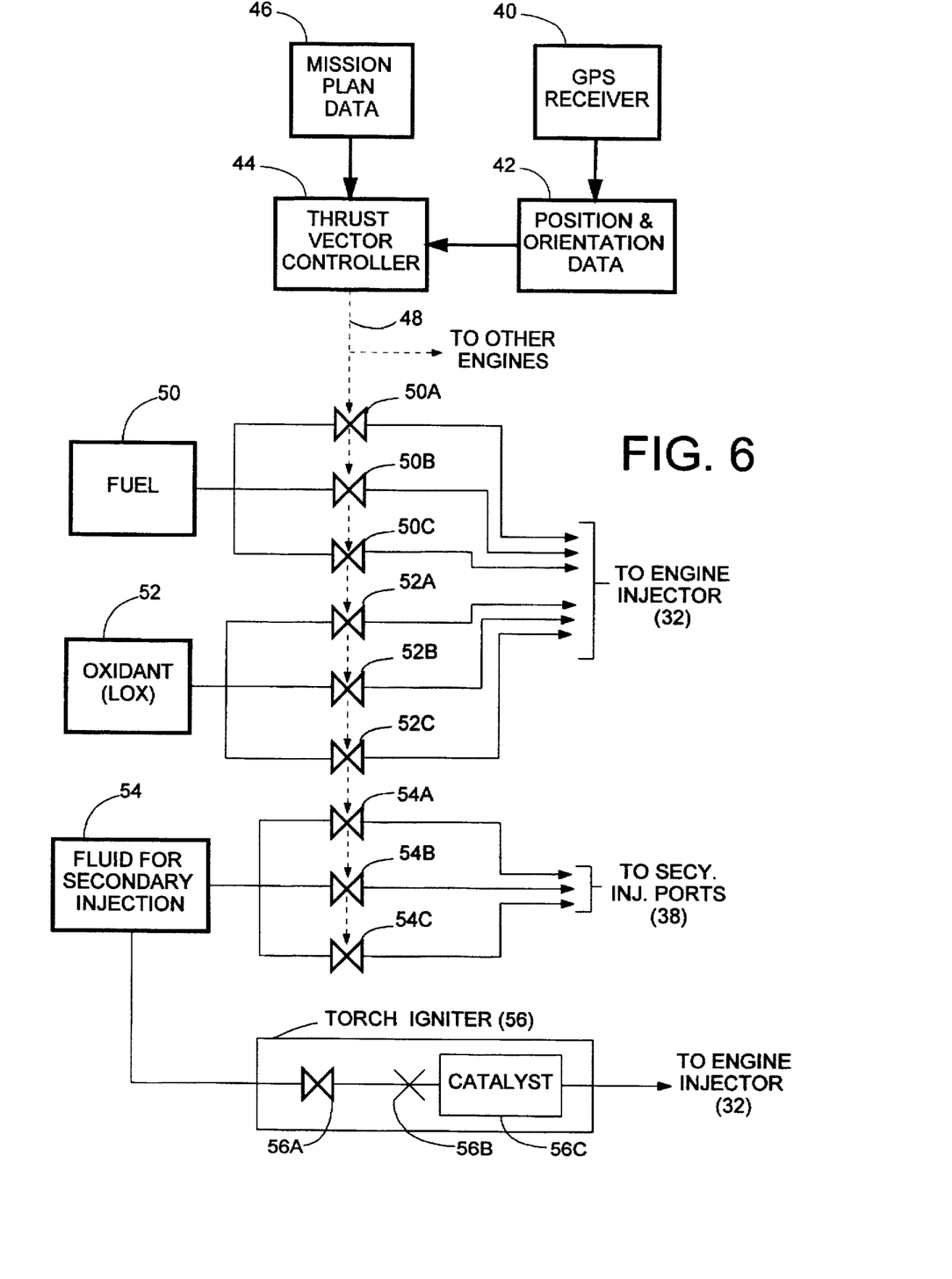
FIG. 6 is a block diagram showing how steering control is achieved in the vehicle of the invention.

FIG. 6 shows diagrammatically how differential steering is effected in the vehicle of the invention. To avoid costly inertial measurement systems, the vehicle includes a low cost global positioning system (GPS) receiver 40 combined with a low cost inertial measurement unit, from which translational data (position and velocity) can be computed periodically, as indicated at 42. Rotational data (attitude and angular rate) are also obtained from these low cost measurement devices. These translational and rotational data are supplied to a thrust vector controller 44, along with mission plan data 46. The mission plan data define, among other things, the broad navigational goals of the launch vehicle, such as the ultimate orbital parameters of the intended path of the payload. The thrust vector controller 44 computes the necessary course and attitude corrections that need to be made to satisfy the mission data, based on the measured translational and rotational states. These corrections are converted in the thrust vector controller 44 to valve control signals on lines 48 to a plurality of fluid flow control valves.

The lower portion of FIG. 6 depicts the valve arrangement for a single engine, in which liquid fuel is supplied from a tank 50, oxidant (such as liquid oxygen) is supplied from a tank 52, and fluid for secondary injection is supplied from a tank 54. A total of nine on/off valves are used in to control each engine in a presently preferred embodiment of the invention. To control the flow of fuel from tank 50, three valves 50A, 50B and 50C are connected in parallel between the tank 50 and the engine injector 32. Similarly, to control the flow of oxidant from the tank 52, three valve 52A, 52B and 52C are connected in parallel between the tank 52 and the engine injector 32. Valves 50A and 50B are identical in size and structure, as are valves 52A and 52B. When valves 50A, 50B, 52A and 52B are all open, the engine provides its maximum (100%) thrust. With only one valve open for fuel and oxidant, such as valves 50A and 52A, and the other valves closed, the fuel and oxidant flow rate is reduced and the thrust is reduced to approximately 82% of full thrust. Variation of the engine thrust over a wider range, and with smaller increments, is obtained by varying the on/off duty cycle of the two pairs of valves, at a selected rapid modulation rate, such as 200 ms (milliseconds). In other words, even though only two levels of instantaneous thrust are available, the effective thrust as measured over a longer period of time can be varied over a wide range.

The third fuel valve 50C and the third oxidant valve 52C are sometimes referred to as pilot valves. They are normally closed in flight, but are used to supply an initial flow of fuel and oxidant during engine start-up. With only the valves 50C and 52C open, the engine operates at approximately 50% thrust, which is insufficient to lift the vehicle from the ground before launch. The pilot valves 50C and 52C are also used briefly during flight to ignite each successive rocket stage.

Three additional on/off valves 54A, 54B and 54C are used to control the flow of secondary injection fluid from the tank 54 to the three injection ports 38 in the exhaust nozzle 34 of the engine. Selective activation of these valves changes the thrust vector in a desired direction.

Ignition of each engine is effected by means of a torch igniter 56. In accordance with the invention, the igniter 56 uses secondary injection fluid from supply 54. The fluid passes through an on/off valve 56A and a check valve 56B, and is brought into contact with a catalyst 56C, which initiates a reaction that generates sufficient heat to ignite the engine, which then continues to burn using the fuel and oxidant supplied through the pilot valves 50C and 52C. When sufficient pressure builds up in the engine combustion chamber 30 (FIG. 5), the check valve 56B automatically shuts off flow of fluid through the igniter 56.

In some configurations, the engines may be grouped in any logical manner for steering purposes, and the grouping may be changed when a new rocket stage is reached. For example, initially the valves (50A, 50B, 52A, 52B) may be coupled to the seven engine clusters 10A, 10B, 12A, 12B, 14A, 14B and 16. Steering about a particular axis may be effected by controlling the thrust applied, for example, to clusters 10A and 10B. This control axis may be thought of as aligned in a direction perpendicular to a diametric line between the two clusters and perpendicular to the direction of thrust. If this axis is designated the yaw axis, steering about a perpendicular pitch axis could be effected by controlling the thrust of both other pairs of engine clusters in coordination. More generally, each pair of engine clusters may be considered to control steering about a separate axis perpendicular to the direction of thrust, and these six separate axes are angularly separated by 30°. Normally, attitude control of an aircraft or spacecraft is considered in terms of three orthogonal axes: a roll axis in the fore-aft direction, which is usually the direction of travel, a pitch axis perpendicular to the roll axis, and a yaw axis perpendicular to both other axes. Thrust vector control of rocket vehicle allows steering about the pitch and yaw axis, but not about the longitudinal or roll axis unless auxiliary thrusters are provided. The hexagonal configuration of the present invention provides for steering control about six separate axes that are each perpendicular to the roll axis (the thrust direction), when all outer clusters are operating. One of the functions of the thrust vector controller is to convert desired steering corrections, which are conventionally expressed in terms of pitch and yaw corrections, into corresponding six-axis correction signals for application to the individual engines or engine clusters.

A further complication for the use of thrust vector control is that rocket staging requires reconfiguration of the thrust vector controller. In the second stage, only two pairs of engine clusters are available for steering, so the work of the missing pair must be performed by the remaining pairs. Thus the mathematics of conversion of desired steering corrections in pitch and yaw axes into thrust vector control signals, must be modified accordingly. Similarly, when the third stage is reached only three clusters remain. Steering using the remaining clusters permits correction about only one axis. For steering about the other axis, individual engines in the clusters must be differentially controlled. Finally, in the fourth stage, when only one cluster remains, the engines must be individually controlled in the same manner as the clusters were controlled during the first stage. Mathematically, these transformations are not considered to be complex once the problem is understood. Further explanation is provided in the following descriptive section.

Figure 7:
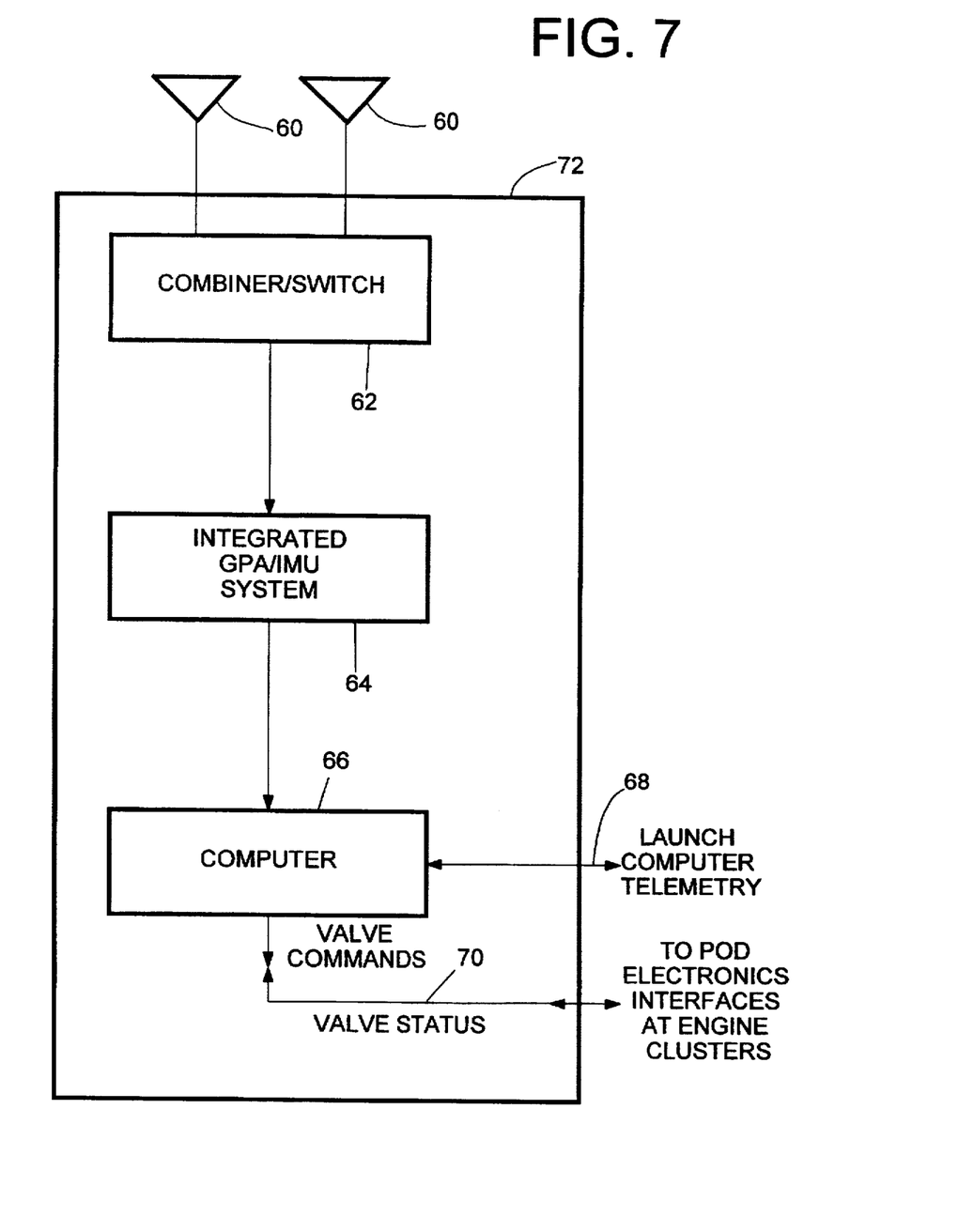
FIG. 7 is a block diagram showing the principal hardware components of a guidance, navigation and control system used in the vehicle of the invention.

Guidance, Navigation and Control System:

FIG. 7 is a block diagram showing the basic hardware components used in the vehicle of the invention for performing the functions of guidance, navigation and control. One or more antennas 60 feed into a signal combiner 62, from which radio-frequency (rf) signals are coupled to an integrated Global Positioning System (GPS) receiver and inertial measurement unit (IMU) 64. An available navigation unit meeting the basic requirements of the invention is manufactured by Rockwell Collins and is designated the C-MIGITS (Miniature Integrated GPS/INS Tactical System). This unit provides position, velocity, attitude, heading and angular velocity at user selectable rates of 1 Hz or 10 Hz over either an RS-232 or an RS-422 serial interface. These measurements are transmitted through the selected serial interface from the integrated unit 64 to a computer 66, which directs all of the guidance and control functions for vehicle. The C/MIGITS integrated unit incorporates two inexpensive but complementary navigation devices: the NavCore V GPS receiver and the GIC-100 IMU. The five-channel GPS receiver provides stable position and velocity information. The IMU provides acceleration and attitude rate information at a high rate with high accuracy over the short term. The two sets of data are combined using a Kalman filter running on an integral computer. In essence, the drift rates and biases of the IMU are continually compensated for by the GPS data, especially in the presence of acceleration that accompanies vehicle maneuvers.

In addition to receiving measurement data from the integrated GPS/IMU system 64, the computer 66 has two principal input/output interfaces: launch computer telemetry data is transmitted and received as indicated by line 68, and valve commands and valve status signals are transmitted and received over line 70. The entire guidance, navigation and control system, with the exception of the antennas 60, is housed in environmental packaging 72. The presently preferred computer is supplied by Southwest Research Institute (SWRI) and is designated SC-2DX. It includes an Intel 80C186EC central processing unit operating at a 16 MHZ clock rate, an Intel 80C187EC co-processor, 512K error detecting and correcting RAM (random access memory), 64K error detecting and correcting UV-PROM (programmable read-only memory, ultraviolet erasable), and 256K error detecting and correcting EE-PROM (programmable read-only memory, electronically erasable).

Additional computer resources are distributed in the form of a pod or cluster controller (not shown) located at each engine cluster. Each such controller converts computer commands to valve control signals and collects status information to be reported back to the computer 66.

Figure 8:
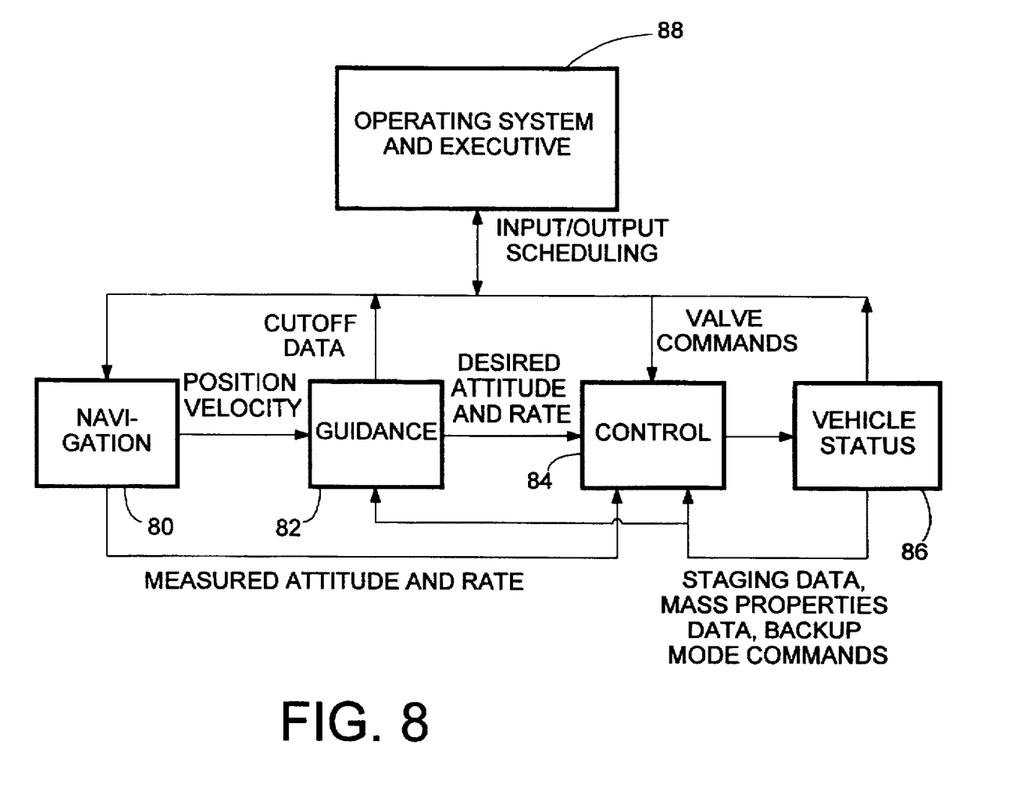
FIG. 8 is a block diagram showing the principal software components of the guidance, navigation and control system used in the vehicle of the invention.

The architecture of the software installed in the computer 66 conforms with the principal functions performed, as indicated in the software block diagram of FIG. 8. The software components include a navigation component 80, a guidance component 82, a control component 84, a vehicle status component 86 and an operating system and executive component 88. The executive component 88 schedules the execution of all the other software components. It also handles the necessary input/output functions of the guidance, navigation and control system. It contains, as is conventional, a clock function providing timing signals to the other components and, for accuracy of operation, performs final countdown and to engine shutdown and issues engine shutdown commands directly. The executive software is currently implemented using the VRTX-32 real-time operating system.

The navigation component 80 receives navigation data from the integrated GPS/IMU system 64 and passes position and velocity data to the guidance component 82, and measured attitude and rate data to the control component 84.

The Guidance component 82 computes the desired attitude and attitude rate to achieve the desired burnout conditions. It also provides an estimate of the time remaining to burnout and of the velocity to be gained to burnout.

The vehicle status component performs multiple housekeeping functions pertaining to the status of the vehicle. These include: (a) estimating the vehicle mass, mass flow rate, specific impulse, and moments of inertia, and sending these data back to the guidance component 82 and the control component 84; (b) commanding major events, such as liftoff and staging, and providing the other components with status indications pertaining to these major events; (c) monitoring the health and status of the vehicle's systems and taking appropriate action in the event of detected failure or alarm conditions; and (d) preparing a stream of telemetry data for transmission to a ground station.

The control component 84 has only one basic function: it computes the valve commands required to drive the attitude and attitude rate to the desired attitude and attitude rate. These are the steering commands referred to in the discussions above. Because the present invention performs this control function without the aid of gimballed engines, implementation of the control component 84 is important to the invention, and one of its possible implementations will be described in more detail.

Steering by Engine Sector Selection:

Because the launch vehicle of the invention uses a relatively large number of engines, each of which may controlled by selective throttling, there are many possible ways of implementing the steering function of the vehicle. There are two major approach choices that affect how the steering is implemented. First, there is the choice of either breaking down the rotation command into independent pitch and yaw engine selections or selecting engines that will provide steering torque about an arbitrary axis. It will be recalled that control of attitude and rate about conventional pitch and yaw axes is rendered difficult by the hexagonal engine configuration, which facilitates control about any of six axes of symmetry. The second major consideration is whether to provide engine selection and control by means of a real-time selection algorithm, or whether to control steering based on precomputed engine selections that are accessed using a table lookup process. Based on the overriding goal of simplicity and cost reduction for this vehicle, the presently preferred technique is a table lookup method for selection of engines about an arbitrary axis.

Figure 9:
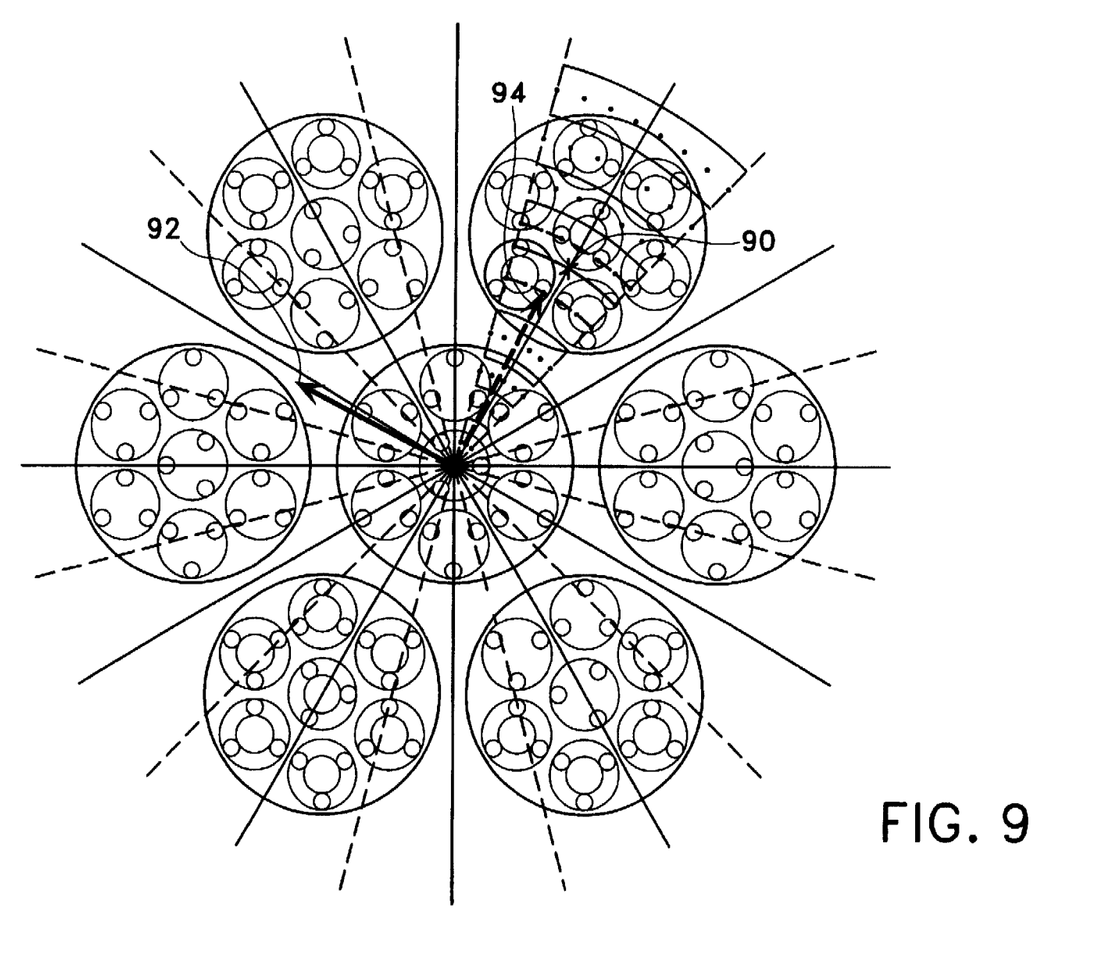
FIG. 9 is a diagrammatic plan view of an engine launch configuration, for purposes of explaining a preferred technique of engine selection to effect vehicle steering.
Figure 10:
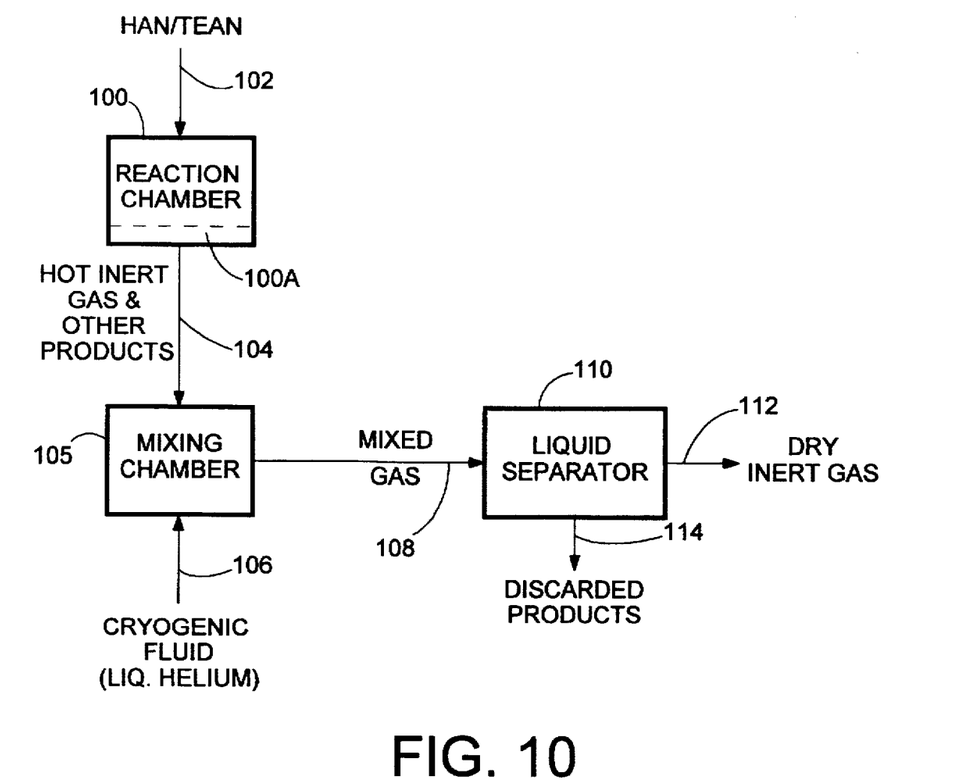
FIG. 10 is a simplified block diagram of an onboard gas generator used on the vehicle of the invention.

FIG. 9 is a plan view (from above) of a launch configuration of forty-nine engines arranged in seven pods or clusters, consistent with the foregoing detailed description. There are six axes of symmetry, indicated by the solid diametric lines, which may be considered to divide the configuration radially into twelve sectors. The broken diametric lines drawn midway between the axes of symmetry indicate the sector boundaries, and the solid lines define the sector centerlines. If symmetrical pairs of engines (located on each side of a sector centerline), or single engines lying on a centerline, are progressively added to a selection of throttled engines, starting with the pair farthest from the center of the vehicle, increasing levels of steering torque are produced about an axis perpendicular to the sector centerline. These different levels of torque could be represented on a polar plot with an appropriate scale as points along the sector centerline. They are depicted in FIG. 9 as the points where the solid arcs cross the sector centerline. Torque level boundaries, i.e., torque levels midway between those so obtained, are depicted as the points where the dotted arcs cross the sector centerline, approximately halfway between the solid arcs.

A region bounded by a pair of adjacent sector boundaries and a pair of adjacent torque level boundaries is called a Selection Region. One such region is depicted in FIG. 9 at 90. The torque direction and torque level for a Selection Region is defined by the torque point on the sector centerline, i.e. by the intersection of the sector centerline and the solid arc at the middle of the Selection Region. A desired torque vector, represented by the arrow 92, is mapped into its Sector Selector Vector, depicted by the dashed arrow 94. The Sector Selector Vector is simply the desired torque vector rotated clockwise by 90°. The Sector Selector Vector indicates the direction in which engines (or about which pairs of engines) should be selected to be throttled down in order to effect a torque about the desired torque vector. The magnitude of the Sector Selector Vector indicates the desired level of torque and can be superimposed upon the arcs that represent available torque on the sector centerline. Thus, sector selection of engines to be throttled is determined by the location of the arrowhead of the Sector Selector Vector. In other words, the engines to be throttled are those engines represented by the Selection Region within which the tip of the Sector Selection Vector lies.

Because not all of the engine clusters will be available for steering purposes during all phases of the vehicle's flight, it will not always be possible to provide for steering in all twelve sectors. Depending on the vehicle mission, typically more clusters than just those in the first stage will be ignited at lift off, and other clusters may be ignited in flight, even before staging occurs. At any given time in the flight, steering control will selectively employ those engine clusters that are available for this purpose. For example, a particular flight plan may call for the ignition of four clusters (the first and second stages) at liftoff, and the subsequent ignition of the third-stage clusters before the first stage is completed. With all three stages (all outer clusters) in operation, steering can be controlled in any of the twelve sectors. Subsequently, after the first and second stages are released, only two outer clusters are available for steering, providing fewer sector selections for steering. When only the central cluster remains, steering can still be effected with the separate engines in the central cluster, but with only limited steering torque.

Secondary injection provides for additional steering control, especially when throttling control is not available or not as effective, as when only the fourth stage is operational. Secondary injection is also used for roll control, since it is the only available technique that deflects the engine exhaust.

The mathematical basis for the control component 84 using this approach is set forth in Appendix A to this specification. By way of further example, a FORTRAN source language program listing is provided in Appendix B. The material in Appendix A was developed under a Small Business Innovation Research (SBIR) contract (Phase 1) from the United States Air Force, contract no. F29601-93-C-0106, and the material in Appendix B was developed under a SBIR contract (Phase 2) from the United States Air Force, contract no. F29601-94-C-0017. The program listing is for a simplified configuration including only three engines arranged symmetrically, allowing for the selection of only six possible sectors. However, it is conceptually simple matter to expand the program to include a lookup table to accommodate more sectors, as in the twelve-sector embodiment discussed above.

Liquid Supply Tank Pressurization:

As mentioned throughout, the principle goal of the present invention is to minimize cost without compromising the reliability of the launch vehicle. One design choice in this regard was to use low-cost liquid-propellant engines. The supply of liquid propellant to multiple engines requires the use of an inert gas in the propellant tanks, to maintain a uniform flow of propellants in all positions and configurations of the vehicle. Typically, the propellant has to be pressurized to about 500 psi (pounds per square inch) or approximately 350,000 kg/m$^2$. In the vehicle of the present invention, cost is greatly reduced by using an on-board gas generator for this purpose. Moreover, the same fluid that is used for gas generation is also used for rocket ignition and for thrust vector control.

The gas generation function is depicted in the block diagram of FIG. 7, in which a reaction chamber 100 receives a gas generating fluid, as shown at 102. The reaction chamber 100 contains a quantity of catalyst material 100A that initiates the reaction in the chamber. The catalyst 100A can be any suitable material for the gas generating fluid employed. For the preferred HAN/TEAN fluid defined below, the catalyst may be simply steel shot, or a proprietary catalyst may be available from the supplier of the HAN/TEAN solution. The reaction produces, as indicated at 104, a hot gas mixture, including nitrogen, carbon dioxide and water in the gaseous state. The hot gaseous mixture is further processed in a mixing chamber 105, which also receives, over line 106, an inert cryogenic fluid, such as liquid helium. In the mixing chamber 105, the hot gases are mixed with the cryogenic fluid and the result is a mixed, wet gas mixture, as indicated at 108. The mixture is passed through a liquid separator 110 to produce a dry, inert gas, as indicated at 112, and consisting of a mixture of helium and nitrogen. Discarded products include liquid carbon dioxide and water, as indicated at 114.

In the presently preferred embodiment of the invention, the gas generating fluid is a propellant known as XM-46 and manufactured by Allied Signal Corporation. XM-46 is a formulation of two salts known as HAN and TEAN, and water. The chemical content is:

| | |
|---|---|
| HAN (hydroxylamine nitrate, a salt) - | $NH_2OH\ NO_3$ |
| TEAN (tri-ethanol amine nitrate, a salt) - | $(HOCH_2CH_2)_3\ NHNO_3$ |
| Water - | $H_2O$ |

As presently formulated for use as a gun propellant (liquid gun powder), XM-46 is 20% water and 80% HAN and TEAN dissolved in the water. The formulation stays in liquid form over a wide temperature range, from −100° F. to +212° F.

The gas generation reaction produces a mixture of nitrogen ($N_2$), water ($H_2O$) and carbon dioxide ($CO_2$). Both the water and the carbon dioxide are liquid at 20° C. (±20° C.) and 500 psi. Therefore, they can be separated from the inert gas with a conventional liquid separator and dumped overboard without difficulty. The HAN-TEAN mixture also serves as an ideal material to ignite the engines and as an ideal fluid for secondary injection thrust vector control.

Comparison with Conventional Launch Vehicles:

valves and cryogenic fluid valves. Economies of scale can be achieved because each vehicle uses as many as forty-nine identical engines and can be manufactured in ten-vehicle lots for further manufacturing economy.

Because of its low height-to-base ratio, the launch vehicle of the present invention needs no expensive gantry equipment for transport to the launching pad or to secure the vehicle until liftoff. Moreover, since guidance and control are autonomous functions, using conventional GPS technology for navigation, the vehicle incurs little or no cost for ground-based guidance and control.

Because of its modular design, the vehicle can be conveniently configured to include multiple redundancy in all key components. The guidance, navigation and control system, which is largely electronic, can be built with redundancy using conventional computer design principles. Functional redundancy can be easily built into the engine configuration, such that the vehicle can tolerate multiple engine failures and still perform its desired mission. The control system adjusts to sensed engine failures by switching propellant flow appropriately to other functioning engines and adjusting the burn times to achieve the desired orbit.

In terms of overall cost, the launch vehicle of the invention achieves a cost reduction by a factor of ten or more relative to other conventional launch vehicles. The following two tables compare the cost and performance of the vehicle of the invention with corresponding figures for selected vehicles of the prior art. All figures are estimates, but indicate the dramatic cost reductions that can be achieved with use of the launch vehicle of the invention.

| Small Launchers | Type | Weight to LEO (kg) | Gross Lift-off Wt. (Kg) | Payload Fraction | $ per Launch | $ per kg | $ per lb |
|---|---|---|---|---|---|---|---|
| Pegasus | Solid | 325 | 18,800 | 1.7% | $15M | $46,200 | $21,000 |
| PacAstro-2 | Liquid | 350 | 32,500 | 1.1% | $6M | $17,100 | $7,800 |
| Conestoga 2622 | Solid | 1,090 | 88,900 | 1.2% | $19M | $17,400 | $7,900 |
| Taurus | Solid | 1,375 | 68,000 | 2.0% | $17M | $12,400 | $5,600 |
| Invention (small) | Liquid | 1,000 | 70,000 | 1.6% | $1.7M | $1,700 | $770 |

| Medium Launchers | Type | Weight to LEO (kg) | Gross Lift-off Wt. (Kg) | Payload Fraction | $ per Launch | $ per kg | $ per lb |
|---|---|---|---|---|---|---|---|
| Delta | Mix | 5,000 | 230,000 | 2.2% | $45M | $9,000 | $4,100 |
| Atlas IIAS | Mix | 8,400 | 234,000 | 3.6% | $85M | $10,100 | $4,600 |
| Long March (China) | Liquid | 9,200 | 465,000 | 2.0% | $65M | $7,100 | $3,200 |
| Ariane 44L | Liquid | 9,600 | 470,000 | 2.0% | $120M | $12,500 | $5,700 |
| Invention (med.) | Liquid | 6,800 | 432,000 | 1.6% | $7.9M | $1,170 | $530 |

Each engine of the launch vehicle of the present invention is designed to provide approximately 5,000 lb thrust (22,000 Newtons), and contains only about thirty-eight parts, most of which can be manufactured in quantity without costly operator intervention. The propellant injector is the most complex component and requires many precisely drilled holes in cast aluminum. Most of the other engine parts, as well as the propellant tanks and engine shrouds, are formed from graphite epoxy, which is a high strength, low density and low cost material. For further economy, the engine structure is formed directly around the propellant injector, with no machined interface or seals. Unlike conventional launch vehicle engines, the engine used in the invention has no gimbals, actuators or hydraulic systems for steering purposes, since steering is effected solely with propellant These figures demonstrate the low recurring costs associated with the launch vehicle, but it will be appreciated that the same factors that contribute to the lower recurring costs also result in a similarly low developmental cost. Because the vehicle has fewer components and practically no moving parts except valves, its detailed design and development have not been subject to the delays and cost over-runs often associated with the development of more complex space vehicles.

It will be appreciated from the foregoing that the present invention represents a significant advance in launch vehicles. In particular, the use of horizontal staging in combination with a low-cost engine and thrust vector steering is primarily the key to the dramatic cost improvement in the launch vehicle. Other features that contribute to the vehicle's simplicity and low cost are the use of autonomous navigation and control systems, steering by thrust vector control using secondary fluid injection, use of an onboard gas generator to supply pressurizing gas to the propellant tanks, and use of the same fuel for gas generation, secondary fluid injection, and engine ignition.

It will also be appreciated that, although a specific embodiment of the invention has been described in detail for purposes of illustration, various modifications may be made without departing from the spirit and scope of the invention. Accordingly, the invention should not be limited except as by the appended claims.

We claim:

1. An expendable, economical, liquid-propellant launch vehicle, for launching a payload along a desired trajectory, the vehicle comprising:

a central structure in which a payload is stowed;

a plurality of clusters of liquid-propellant rocket engines, the clusters being configured at launch in symmetric groups of clusters, with each such group being disposed symmetrically about the central structure, wherein each symmetric group of engine clusters is burned and separated from the vehicle in a staging sequence, and wherein each cluster consists of a plurality of similar engines without gimbals;

a common propellant supply system for each clusters having at least two propellant tanks for supplying liquid propellant to the engines;

valve control means between the propellant tanks and the engines, for regulating the supply of propellant to the engines; and a steering control system, coupled to the valve control means, for modulating the supply of propellant to selected engines to provide differential thrust control and thereby to effect steering of the vehicle.

2. A launch vehicle as defined in claim 1, wherein:

the central structure includes an additional engine cluster to provide a final rocket stage.

3. A launch vehicle as defined in claim 1, wherein:

each symmetric group is a pair of clusters and there are three such pairs of engine clusters arrayed about the central structure in a hexagonal configuration, providing three rocket stages.

4. A launch vehicle as defined in claim 1, wherein:

each engine cluster includes seven individually controlled engines arranged with six of the engines forming a hexagonal configuration about a seventh engine.

5. A launch vehicle as defined in claim 1, wherein the ratio of the height of the vehicle to the base width of the vehicle at launch is less than 3:1.

6. A launch vehicle as defined in claim 1, and further comprising:

an onboard gas generator for generating an inert gas for propellant tank pressurization.

7. A launch vehicle as defined in claim 3, wherein:

the clusters of engines are logically mapped into angular sectors extending from the central cluster, each diametrically opposed pair of sectors affording the capability of steering about a sector steering axis perpendicular to a centerline through the pair of sectors;

the steering control system includes means for selecting individual engines for throttling, based on their positions in the angular sectors; and throttling engines positioned on a sector centerline and pairs of engines symmetrically disposed about the centerline, generates a steering torque about the steering axis.

8. A method for launching a payload along a desired trajectory, using a horizontally staged launch vehicle, the method comprising the steps of:

placing a payload in a central rocket pod of a launch vehicle;

assembling the launch vehicle in a broad-based configuration having groups of engine clusters surrounding the central pod in a symmetrical arrangement;

burning and then separating a first group of the engine clusters;

burning and then separating additional groups of engine clusters in a staged burn sequence;

steering the vehicle by modulating the thrust of selected engines, to tilt the vehicle about a selected axis; and modulating the thrust direction of selected engines by injecting a controlled amount of cryogenic fluid into the selected engines.

9. An expendable, economical, liquid-propellant launch vehicle, for launching a payload along a desired trajectory, the vehicle comprising:

a central structure in which a payload is stowed;

a plurality of clusters of rocket engines, the clusters being configured at launch in symmetric groups of clusters, with each such group being disposed symmetrically about the central structure, wherein each symmetric group of engine clusters is burned and separated from the vehicle in a staging sequence, and wherein each cluster consists of a plurality of similar engines without gimbals;

at least two propellant tanks for supplying liquid propellant to the engines;

valve control means for regulating the supply of propellant to the engines;

a steering control system, for modulating the supply of propellant to selected engines to provide differential thrust control and thereby to effect steering of the vehicle;

an onboard gas generator for generating an inert gas for propellant tank pressurization, wherein the onboard gas generator includes a supply of reactant fluid, a supply of inert cryogenic fluid, a reaction chamber in which the reactant fluid reacts to produce an inert gas and heat, a mixing chamber to mix the cryogenic fluid and hot inert gas, and a filter for removing the unwanted products of the reaction, leaving the inert gas for use as a pressurizing gas in propellant supply tanks on the vehicle.

10. An expendable, economical launch vehicle, for launching a payload along a desired trajectory, the vehicle comprising:

a central structure containing the payload and a central cluster of liquid-propellant rocket engines;

six additional clusters of liquid-propellant rocket engines, the clusters being configured at launch in three pairs of clusters, with each pair being disposed symmetrically about the central structure, wherein each pair of engine clusters is burned and separated from the vehicle in a staging sequence, and wherein each cluster consists of a plurality of similar engines without gimbals;

a common propellant supply system having at least two propellant tanks for supplying liquid propellant to each engine cluster;

at least one fluid storage tank for supplying a secondary injection fluid to the engines;

valve control means between the propellant tanks and the engines, for regulating the supply of propellant and secondary injection fluid to the engines; and a steering control system, coupled to the valve control means, for modulating the supply of propellant to selected engines to provide differential thrust control to effect steering of the vehicle.

11. A vehicle as defined in claim 10, wherein:
each engine cluster includes seven individually controlled engines arranged with six of the engines forming a hexagonal configuration about a seventh engine.

12. A launch vehicle as defined in claim 10, wherein the ratio of the height of the vehicle to the base width of the vehicle at launch is less than 3:1.

13. A launch vehicle as defined in claim 10, and further comprising:
an onboard gas generator for generating an inert gas for propellant tank pressurization.

14. A launch vehicle as defined in claim 10, wherein:
the clusters of engines are logically mapped into angular sectors extending from the central structure, each diametrically opposed pair of sectors affording the capability of steering about a sector steering axis perpendicular to a centerline through the pair of sectors;
the steering control system includes means for selecting individual engines for throttling, based on their positions in the angular sectors; and
throttling engines positioned on a sector centerline and pairs of engines symmetrically disposed about the centerline, generates a steering torque about the steering axis.

15. An expendable, economical launch vehicle, for launching a payload along a desired trajectory, the vehicle comprising:
a central structure containing the payload and a central cluster of rocket engines;
six additional clusters of rocket engines, the clusters being configured at launch in three pairs of clusters, with each pair being disposed symmetrically about the central structure, wherein each pair of engine clusters is burned and separated from the vehicle in a staging sequence, and wherein each cluster consists of a plurality of similar engines without gimbals;
at least two propellant tanks for supplying liquid propellant to each engine cluster;
at least one fluid storage tank for supplying a secondary injection fluid to the engines;
valve control means for regulating the supply of propellant and secondary injection fluid to the engines;
a steering control system, for modulating the supply of propellant to selected engines to provide differential thrust control to effect steering of the vehicle; and
an onboard gas generator for generating an inert gas for propellant tank pressurization, wherein the onboard gas generator uses a cryogenic fluid from which to generate the inert gas.

16. A launch vehicle as defined in claim 15, wherein the onboard gas generator includes:
means for drawing reactant fluid-from the supply tank of secondary injection fluid;
a supply of cryogenic fluid;
a reaction chamber containing a catalyst, wherein the reactant fluid produces a hot inert gas and other products of the reaction; and
a mixing chamber for mixing the hot inert gas and other products of reaction with the cryogenic fluid, to produce a mixture of gases;
a filter for removing the unwanted products of the reaction, leaving a dry inert gas for use as a pressurizing gas in propellant tanks on the vehicle.

17. A method for launching a payload along a desired trajectory, using a horizontally staged launch vehicle, the method comprising the steps of:

placing a payload in a central rocket pod of a launch vehicle;
assembling the launch vehicle in a broad-based configuration having groups of liquid-propellant engine clusters surrounding the central pod in a symmetrical arrangement;
burning and then separating a first group of the engine clusters;
burning and then separating additional groups of engine clusters in a staged burn sequence; and
steering the vehicle by modulating the thrust of selected engines, to tilt the vehicle about a selected axis.

18. A method as defined in claim 17, wherein modulating the thrust of selected engines is effected by:
selectively actuating a plurality of on/off valves supplying propellant to the selected engines.

19. A method as defined in claim 18, wherein the step of selectively actuating the plurality of on/off valves includes:
varying the duty cycle of the valves to provide a desired modulated thrust.

20. A method as defined in claim 17, wherein:
the method further comprises logically mapping the clusters of engines into angular sectors extending from the central pod, each diametrically opposed pair of sectors affording the capability of steering about a sector steering axis perpendicular to a centerline through the pair of sectors; and
the steering step includes selecting individual engines for throttling, based on their positions in the angular sectors, and throttling engines positioned on a sector centerline and pairs of engines symmetrically disposed about the centerline, to generate a steering torque about the steering axis.

21. A method as defined in claim 17, and further comprising:
generating a supply of inert gas on the launch vehicle; and
applying the inert gas to pressurize propellant supplies for the vehicle.

22. An expendable, economical, liquid-propellant launch vehicle, for launching a payload along a desired trajectory, the vehicle comprising:
a central structure in which a payload is stowed;
a plurality of clusters of rocket engines, the clusters being configured at launch in symmetric groups of clusters, with each such group being disposed symmetrically about the central structure, wherein each symmetric group of engine clusters is burned and separated from the vehicle in a staging sequence, and wherein each cluster consists of a plurality of similar engines without gimbals;
at least two propellant tanks for supplying liquid propellant to the engines;
valve control means for regulating the supply of propellant to the engines;
a steering control system, for modulating the supply of propellant to selected engines to provide differential thrust control and thereby to effect steering of the vehicle;
an onboard gas generator for generating an inert gas for propellant tank pressurization; and
a supply of an inert cryogenic fluid for secondary injection into the engine, wherein the onboard gas generator uses the cryogenic fluid from which to generate the inert gas.

* * * * *